(12) United States Patent
Takahashi

(10) Patent No.: US 8,027,826 B2
(45) Date of Patent: Sep. 27, 2011

(54) EVALUATION DEVICE CONSISTING OF A LOGIC SIMULATOR AND A SIMULATION RESULT TABLE

(75) Inventor: Fumio Takahashi, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 622 days.

(21) Appl. No.: 12/172,346

(22) Filed: Jul. 14, 2008

(65) Prior Publication Data
US 2009/0024379 A1  Jan. 22, 2009

(30) Foreign Application Priority Data
Jul. 20, 2007 (JP) .................................. 2007-189020

(51) Int. Cl.
*G06F 17/50* (2006.01)
(52) U.S. Cl. .......................................... 703/14; 716/106
(58) Field of Classification Search ..................... 703/14; 716/106
See application file for complete search history.

(56) References Cited

U.S. PATENT DOCUMENTS

| | | | | |
|---|---|---|---|---|
| 5,563,993 A * | 10/1996 | Sato et al. | ...................... | 345/440 |
| 5,920,711 A * | 7/1999 | Seawright et al. | ............... | 703/15 |
| 6,356,950 B1 * | 3/2002 | Tillmann et al. | ............... | 709/246 |
| 6,370,603 B1 * | 4/2002 | Silverman et al. | ............... | 710/72 |
| 6,457,152 B1 * | 9/2002 | Paley et al. | .................... | 714/738 |
| 6,766,406 B1 * | 7/2004 | Gasperini et al. | ............. | 710/315 |
| 7,162,411 B2 * | 1/2007 | Agarwala et al. | ................ | 703/28 |
| 7,200,545 B2 * | 4/2007 | Lines et al. | ...................... | 703/21 |
| 7,383,547 B1 * | 6/2008 | Miri | ............................... | 718/100 |
| 7,457,737 B2 * | 11/2008 | Patiejunas | ........................ | 703/14 |
| 2001/0049594 A1 * | 12/2001 | Klevans | .......................... | 703/14 |
| 2003/0208616 A1 * | 11/2003 | Laing et al. | .................... | 709/236 |
| 2009/0154464 A1 * | 6/2009 | Kim et al. | ...................... | 370/392 |

FOREIGN PATENT DOCUMENTS

JP  2002-232516  8/2002

OTHER PUBLICATIONS

Emmanuel Viaud, Francois Pecheux, Alaim Greiner, "An Efficient TLM/T Modeling and Simulation Environment Based on Conservative Parallel Discrete Event Principles" University Pierre et Marie Curie, Mar. 6-10, 2006, 6 pages.*

* cited by examiner

*Primary Examiner* — Dwin M Craig
(74) *Attorney, Agent, or Firm* — Young & Thompson

(57) ABSTRACT

Evaluation by logic simulation can be favorably performed. A target packet determination part determines if a target packet which is a response packet that is to be transmitted with respect to a request packet that is received is in a simulation result table. When there is a target packet, a response packet output reads out and transmits the target packet from the simulation result table. On the other hand, when there is no target packet, a system controller forces a logic simulator to perform logic simulation regarding the received request packet, disconnects a connection with an opposing connection device, so as to perform reconnection after completion of the logic simulation by the logic simulator. A table generating part writes the request packet and the response packet obtained by the logic simulator into the simulation result table, the request packet and the response packet being made correspondent to each other.

14 Claims, 15 Drawing Sheets

| TYPE OF NETWORK | EXAMPLE OF OPPOSED DEVICE |
|---|---|
| USB | · COMPUTER HAVING USB HOST CONTROLLER INTERFACE<br>· PRINTER, DIGITAL CAMERA OR THE LIKE HAVING USB PERIPHERAL DEVICE INTERFACE |
| IEEE1394 | · DIGITAL VIDEO CAMERA, DIGITAL RECORDER, DIGITAL TELEVISION OR THE LIKE |
| Ethernet | · PRINTER, HUB, NAS (NETWORK ATTACHED STORAGE: NETWORK STORAGE) OR THE LIKE |

Fig. 2

| | IDENTIFIER FIELD 371 | PARENT IDENTIFIER FIELD 372 | REQUEST PACKET FIELD 373 | RESPONSE PACKET FIELD 374 | EXECUTED FLAG FIELD 375 |
|---|---|---|---|---|---|
| ROW 1 | 1 | 0 | REQ11 | RES11 | 1 |
| ROW 2 | 2 | 1 | REQ21 | RES21 | 1 |
| ROW 3 | 3 | 0 | REQ12 | RES12 | 1 |
| ROW 4 | 4 | 2 | REQ31 | RES31 | 1 |
| ROW 5 | 5 | 2 | REQ32 | RES32 | 1 |
| ROW 6 | 6 | 1 | REQ22 | | 0 |

| | L | P | ROW | IDENTIFIER FIELD 371 | PARENT IDENTIFIER FIELD 372 | REQUEST PACKET FIELD 373 | RESPONSE PACKET FIELD 374 | EXECUTED FLAG FIELD 375 |
|---|---|---|---|---|---|---|---|---|
| START COMMUNICATION | 1 | 0 | | | | | | |
| RECEIVE REQ11 | | | | | | | | |
| DISCONNECT COMMUNICATION | | | 1 | VALUE OF L "1" | VALUE OF P "0" | REQ11 | | |
| SIMULATION | | | 1 | | | | RES11 | 1 |
| RESTART COMMUNICATION | 2 | 0 | | | | | | |
| RECEIVE REQ11 | | | | | | | | |
| TRANSMIT RES11 | 2 | 1 | | | | | | |
| RECEIVE REQ21 | | | | | | | | |
| DISCONNECT COMMUNICATION | | | 2 | VALUE OF L "2" | VALUE OF P "1" | REQ21 | | |
| SIMULATION | | | 2 | | | | RES21 | 1 |
| RESTART COMMUNICATION | 3 | 0 | | | | | | |
| RECEIVE REQ12 | | | | | | | | |
| DISCONNECT COMMUNICATION | | | 3 | VALUE OF L "3" | VALUE OF P "0" | REQ12 | | |
| SIMULATION | | | 3 | | | | RES12 | 1 |
| RESTART COMMUNICATION | 4 | 0 | | | | | | |
| RECEIVE REQ11 | | | | | | | | |
| TRANSMIT RES11 | 4 | 1 | | | | | | |
| RECEIVE REQ21 | | | | | | | | |
| TRANSMIT RES21 | 4 | 2 | | | | | | |

SIMULATION RESULT TABLE 370

TIME →

Fig. 11

| | | | SIMULATION RESULT TABLE 370 | | | |
|---|---|---|---|---|---|---|
| | L | P | ROW | IDENTIFIER FIELD 371 | PARENT IDENTIFIER FIELD 372 | REQUEST PACKET FIELD 373 | RESPONSE PACKET FIELD 374 | EXECUTED FLAG FIELD 375 |
| TRANSMIT REQ21 | 4 | 2 | | | | | | |
| RECEIVE REQ31 | | | 4 | VALUE OF L "4" | VALUE OF P "2" | REQ31 | | |
| DISCONNECT COMMUNICATION | | | 4 | | | | RES31 | 1 |
| SIMULATION | 5 | 0 | | | | | | |
| RESTART COMMUNICATION | | | | | | | | |
| RECEIVE REQ11 | 5 | 1 | | | | | | |
| TRANSMIT RES11 | 5 | 2 | | | | | | |
| RECEIVE RES21 | | | 5 | VALUE OF L "5" | VALUE OF P "2" | REQ32 | | |
| TRANSMIT RES21 | | | 5 | | | | RES32 | 1 |
| RECEIVE REQ32 | 6 | 0 | | | | | | |
| DISCONNECT COMMUNICATION | | | | | | | | |
| SIMULATION | 6 | 1 | | | | | | |
| RESTART COMMUNICATION | | | 3 | | | | | |
| RECEIVE REQ11 | | | | | | | | |
| TRANSMIT RES11 | | | | | | | | |
| RECEIVE REQ22 | | | 6 | VALUE OF L "6" | VALUE OF P "1" | REQ22 | | |
| DISCONNECT COMMUNICATION | | | | | | | | |

→ TIME

Fig. 12

EVALUATION DEVICE CONSISTING OF A LOGIC SIMULATOR AND A SIMULATION RESULT TABLE

BACKGROUND OF THE INVENTION

1. Field of the Invention

The present invention relates to an evaluation technique, and more specifically, to a technique performing evaluation on a logic circuit by logic simulation.

2. Description of Related Art

An emulator has been often used for evaluation of an electronic device. The emulator is a device or software which totally imitates a device opposingly connected to the electronic device (hereinafter referred to as opposing connection device or opposed device) which is an evaluation object, and the emulator can operate in real time.

FIG. 13 corresponds to FIG. 1 in Japanese Unexamined Patent Application Publication No. 2002-232516, and shows an evaluation system employing an emulator. This system evaluates an evaluation object device 2. In this system, an emulator 1 and an evaluation object device 2 are connected through a network 3.

The emulator 1 includes a generating means 1a, a decision means 1b, and a transmission means 1c. The generating means 1a responds to an operation entry from a user designating a response packet with respect to a request packet to generate emulation data 1d. The emulation data 1d defines a behavior regarding communication of other devices (opposed device) that can be connected to the network 3, and the request packet and the response packet are registered to the emulation data while being made correspondent to each other. Upon receiving of the request packet from the evaluation object device 2, the decision means 1b refers to the emulation data 1d to decide the response packet corresponding to the request packet. The transmission means 1c transmits the response packet decided by the decision means 1b to the evaluation object device 2 via the network 3.

In this system, it is possible to set the response packet with respect to the request packet output from the evaluation object device 2 in accordance with the input from the user as desired. In summary, any emulation data 1d can be set by inputting any operation of the opposed device by the user. For example, it is possible to set the response packet in which the operation of the opposed device that may be operated in cooperation with the evaluation object device 2 is imitated. The emulator 1 transmits the response packet with respect to the request packet from the evaluation object device 2 in accordance with the definition of the emulation data 1d. Accordingly, it is possible to evaluate an accuracy of a cooperation behavior performed by the evaluation object device 2 with the opposed device.

On the other hand, in an area of developing the logic circuit, the operation model is constructed by a logical description such as a logical description language (Verilog/VHDL, SystemC, C and so on) of function level or register transfer level (RTL) to perform the logic simulation by employing the operation model in order to check logic function or timing of the designed logic circuit. By this technique, the validity of the logic circuit can be evaluated by the software before implementing the circuit in FPGA (Field Programmable Gate Array) or the like, and thus development burden can be relieved. Hereinafter, software performing the logic simulation is called logic simulator. Since the logic simulator aims to check the logic function or the timing of the logic circuit, the logic simulator generally cannot behave in real time.

The evaluation of the validity of the logic circuit needs to be executed on various types of opposed devices that may be connected with the logic circuit. In order to execute this evaluation by the logic simulation, it is preferable to use the logical description or the operation model of these opposed devices, or in some cases the software for performing the operation model or the like. However, they are owned by a developer and not available to the public, and therefore it is practically impossible to obtain all of them.

On the other hand, even if the operation model of the opposed device is difficult to obtain, since the actual devices are commercially available, it is possible to easily obtain the devices. It is desired to enable the evaluation of the logic circuit by executing the logic simulation with the actual device of the opposed device.

Now, we consider a case where the evaluation technique by emulation shown in FIG. 13 is applied to the logic simulation of the logic circuit. The schematic configuration of the system shown in FIG. 14 is one example of such a case.

As shown in FIG. 14, an evaluation device 30 includes a logic simulator 33, and is connected to an opposed device 10 which is an actual device through a network 20. The logic simulator 33 includes a logical description which is not shown, and the operation model of the logic circuit formed by the logical description is an evaluation object.

A transceiver 31 in the evaluation device 30 receives a request packet REQ from the opposed device 10 and sends back to the opposed device 10 a response packet RES stored in the simulation data 32 and corresponding to the REQ. The simulation data 32 stores the request packet REQ and the response packet RES while being made correspondent to each other. The simulation data 32 is formed by the logic simulator 33 in response to the operation entry from an external device.

By having such a configuration, it is possible to evaluate the logical description included in the logic simulator 33 using the actual device of the opposed device.

Since the response packet RES is obtained by performing the simulation by inputting the request packet REQ of the opposed device 10 to the logic simulator 33 in a range in which the operator can imagine in the system shown in FIG. 14, when the evaluation is performed with the opposed device 10 which is an actual device, there may be some cases in which the response packets RES with respect to the request packets REQ from the opposed device 10 are not registered in the simulation data 32.

If the response packet RES corresponding to the request packet REQ from the opposed device 10 is not registered in the simulation data 32 and the evaluation device 30 does not respond, the opposed device 10 may determine that the communication may not be normally performed by the evaluation device 30 due to the abnormality of the protocol. Then the opposed device 10 may stop communication or reset the network 20, thus the evaluation cannot be continued any more.

Alternatively, it may seem possible to obtain the response packet RES with respect to the request packet REQ by forcing the logic simulator 33 to perform the logic simulation by the operation entry from the external device when the response packet RES with respect to the request packet REQ from the opposed device 10 is not registered in the simulation data 32. However, as stated above, the logic simulator generally cannot behave in real time. Therefore, as shown in FIG. 15, the time from reception of the request packet REQ to the time at which the evaluation device 30 can transmit the response packet RES as a result of performing the logic simulation by the logic simulator 33 to obtain the response packet RES exceeds the maximum value of the response time defined by the standard. As a consequence, the same problem as described above is caused which is the same as the case in which the evaluation device 30 does not respond.

SUMMARY

One aspect of the present invention relates to an evaluation device. The evaluation device includes a logic simulator of a logic circuit capable of being connected with an opposing connection device via a network, a simulation result table, a target packet determination part, a response packet output part, a controller, and a table generating part.

The simulation result table stores a request packet and a response packet while being made correspondent to each other, the response packet being obtained by performing logic simulation with respect to the request packet by the logic simulator.

The target packet determination part determines presence or absence of a target packet transmitted to the opposing connection device upon receiving of the request packet from the opposing connection device via the network, the target packet corresponding to the response packet which is made correspondent to the request packet in the simulation result table.

The response packet output part reads out the target packet from the simulation result table to transmit the target packet to the opposing connection device upon determination of the presence of the target packet by the target packet determination part.

The controller forces the logic simulator to execute the logic simulation for the request packet and disconnects the connection with the opposing connection device upon determination of the absence of the target packet by the target packet determination part, and conducts connection with the opposing connection device again after completion of the logic simulation by the logic simulator.

The table generating part writes the response packet obtained by the logic simulator into the simulation result table, the response packet being made correspondent to the request packet.

Note that "request packet" here and "request packet" in the following description mean the data transmitted from the opposing connection device to the evaluation device, or more accurately, to the logic simulator. Further, "response packet" means the data generated by the logic simulator and transmitted from the evaluation device back to the opposing connection device.

Note that even when the device is replaced with a method, a system, or a program, it can still be considered as one aspect of the present invention.

According to the evaluation technique of the present invention, it is possible to favorably advance the evaluation of the logic circuit by the logic simulation using the opposed device which is an actual device.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 2 is a diagram showing an example of an opposing connection device complied with a network protocol;

FIG. 8 is a diagram showing a simulation result table used in the system shown in FIG. 7;

FIG. 11 is a diagram explaining content registered in the simulation result table along with the processings shown in FIG. 10 (No. 1);

FIG. 12 is a diagram explaining content registered in the simulation result table along with the processings shown in FIG. 10 (No. 2);

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

The embodiments of the present invention will be described hereinafter in detail with reference to the drawings.

First Embodiment

Figure 1:
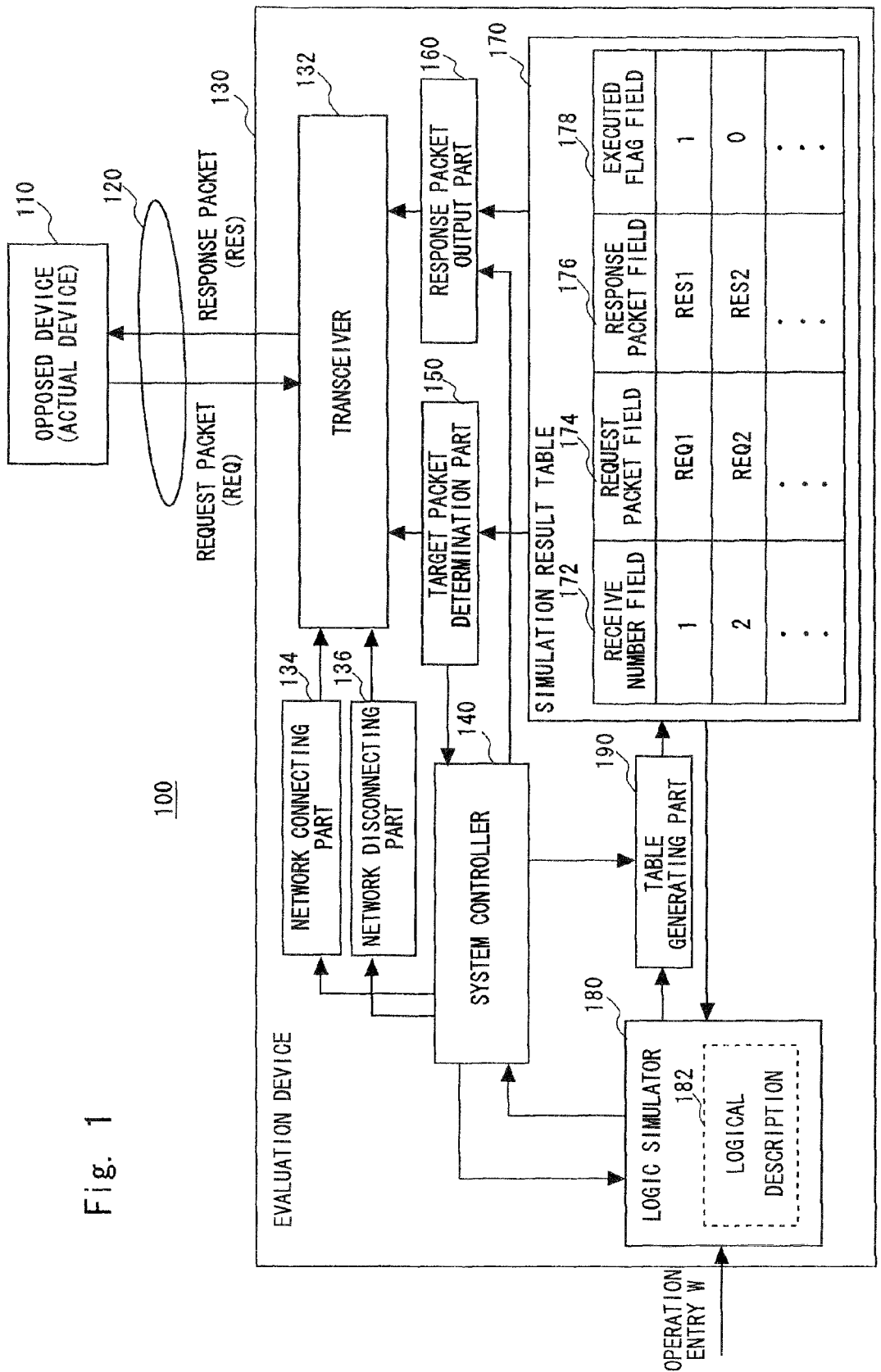
FIG. 1 is a block diagram showing a system according to a first embodiment of the present invention.

FIG. 1 shows a configuration of a system 100 according to the first embodiment of the present invention. The system 100 evaluates validity of a logic circuit that is designed, and includes an opposed device 110 which may be connected to the logic circuit, and an evaluation device 130.

The opposed device 110 is an actual device operating in real time and is connected to the evaluation device 130 via a network 120. The network 120 corresponds to a protocol for communication between devices connected thereto. The network 120 is USB, IEEE1394, Ethernet™ or the like.

As shown in FIG. 2, many types of devices may be used as the opposed device 110 depending on protocols of the network 120.

The evaluation device 130 includes a transceiver 132, a network connecting part 134, a network disconnecting part 136, a system controller 140, a target packet determination part 150, a response packet output part 160, a simulation result table 170, a table generating part 190, and a logic simulator 180. The network connecting part 134, the network disconnecting part 136, and the system controller 140 each has a function as a controller in the claims.

The elements in the evaluation device 130 of the system 100 shown in FIG. 1 are described as function blocks executing various processings. These elements can be configured by a processor, a memory, or an LSI for hardware, and can be configured by a program loaded into the memory for software, for example. Accordingly, a person skilled in the art would appreciate that these function blocks can be variously realized either only by hardware, software, or combination thereof without limitation.

The system controller 140 controls the network connecting part 134, the network disconnecting part 136, the target packet determination part 150, the response packet output part 160, the logic simulator 180, and the table generating part 190.

The transceiver 132 physically converts signals of packets transmitted or received on the network 120 via the network 120, and executes transmission and reception between the opposed device 110 and the evaluation device 130. For example, the transceiver 132 executes the transmission and reception of request packet REQ and response packet RES. The request packet REQ is the data transmitted to the evaluation device 130 by the opposed device 110, and includes information specifying the response (address, instruction code, and so on). The response packet RES is the data transmitted to the opposed device 110 by the evaluation device 130, and includes the response information with respect to the request packet REQ.

The network connecting part 134 connects the opposed device 110 and the evaluation device 130 in accordance with the control of the system controller 140. The network disconnecting part 136 disconnects the connection between the opposed device 110 and the evaluation device 130 via the network 120 in accordance with the control of the system controller 140.

The logic simulator 180 is activated by an operation entry W from an external device, and executes the logic simulation in accordance with the control of the system controller 140. The logic simulator 180 includes a logical description 182. The logical description 182 is an evaluation object, and includes an operation model of the logic circuit described in logical description language or the like and software operating the operation model. The logic simulator 180 executes the logic simulation in accordance with the control of the system controller 140 and outputs the resulting response packet RES to the table generating part 190.

The table generating part 190 performs writing into the simulation result table 170 in accordance with the control of the system controller 140 and the output of the logic simulator 180.

The simulation result table 170 includes a receive number field 172, a request packet field 174, a response packet field 176, and an executed flag field 178.

The receive number field 172 successively stores the value which is incremented one by one. In this embodiment, the values are "1, 2, 3, . . . " as an example. These values function as receiving numbers corresponding to receive order of the request packet since the beginning of reception of a first request packet after the evaluation device 130 is connected to the opposed device 110. For example, when the receiving numbers of "1, 2, 3, . . . " are stored in the receive number field 172 as in the example shown in FIG. 1, the receiving number of the request packet REQ which is received for the first time after connection is "1". Then the receiving numbers of the request packet REQ are described as "2, 3, 4, . . . " in a receiving order until disconnection of the communication every time the request packet REQ is received. When the connection is disconnected and then restarted, the receiving numbers with respect to the request packet REQ received after restart are described again as "1, 2, 3, . . . " in the order of receiving.

The request packet field 174 stores the request packet REQ corresponding to the receive order shown by each receiving number stored in the receive number field 172. This is performed by the table generating part 190 in accordance with the control of the system controller 140.

The response packet field 176 stores the content of the response packet RES which is a simulation result performed by the logic simulator 180 on the request packet REQ. This is performed by the table generating part 190 by receiving the response packet RES from the logic simulator 180.

The executed flag field 178 stores the flag indicating whether the logic simulation has been executed on the request packet REQ. In the example shown in FIG. 1, the request packet REQ 1 whose receiving number is "1" has been subjected to the logic simulation by the logic simulator 180, and the flag corresponding to it is "1", which means the logic simulation has already been executed. On the other hand, the request packet REQ 2 whose receiving number is "2" has not been subjected to the logic simulation by the logic simulator 180, and the flag corresponding to it is "0", which means the logic simulation has not been executed yet. Note that when the logic simulation is executed, it means that the content of the response packet RES with respect to the request packet REQ has already been obtained and that the content is stored in the simulation result table 170.

As stated, the content of the request packet REQ stored in the request packet field 174, the content of the response packet RES stored in the response packet field 176, and the flag stored in the executed flag field 178 are corresponded to one another by the receiving number stored in the receive number field 172, so as to form the simulation result table 170.

The target packet determination part 150 refers to the executed flag field 178 based on the receiving number corresponding to the receive order of the request packet REQ when the transceiver 132 receives the request packet REQ, and determines if the target packet which is the response packet RES to be transmitted back with respect to the request packet REQ is stored in the simulation result table 170. More specifically, the target packet determination part 150 determines that the target packet is stored in the simulation result table 170 when the flag corresponding to the receiving number is "1" in the executed flag field 178. On the other hand, when the flag is "0", then the target packet determination part 150 determines that the target packet is not stored in the simulation result table 170.

The system controller 140 operates as follows according to the determination result made by the target packet determination part 150.

A. When the target packet is stored in the simulation result table 170, the response packet RES corresponding to the target packet is output to the response packet output part 160.

B. When the target packet is not stored in the simulation result table 170, the system controller 140 instructs the network disconnecting part 136 to disconnect the communication with the opposed device 110 and instructs the table generating part 190 to register the request packet REQ. Then the system controller 140 forces the logic simulator 180 to perform the logic simulation with respect to the request packet REQ.

In the case of B above, the logic simulator 180 reads out the instructed request packet REQ from the simulation result table 170 and executes the logic simulation in accordance with the control of the system controller 140. Upon completion of the logic simulation, the logic simulator 180 notifies the system controller 140 that the logic simulation has been completed, and outputs the response packet RES which is the result of the logic simulation to the table generating part 190.

The table generating part 190 writes the request packet REQ in a column of the request packet field 174 corresponding to the receiving number of the request packet REQ in accordance with the instruction from the system controller 140 to register the request packet REQ from the system controller 140. Further, upon receiving of the response packet RES from the logic simulator 180, the table generating part 190 writes the response packet RES in a column of the response packet field 176 corresponding to the receiving number, and sets the flag to "1" stored in the executed flag field 178 and corresponding to the receiving number.

Upon notification of completion of the logic simulation from the logic simulator 180, the system controller 140 instructs the network connecting part 134 to restart communication.

Figure 3:
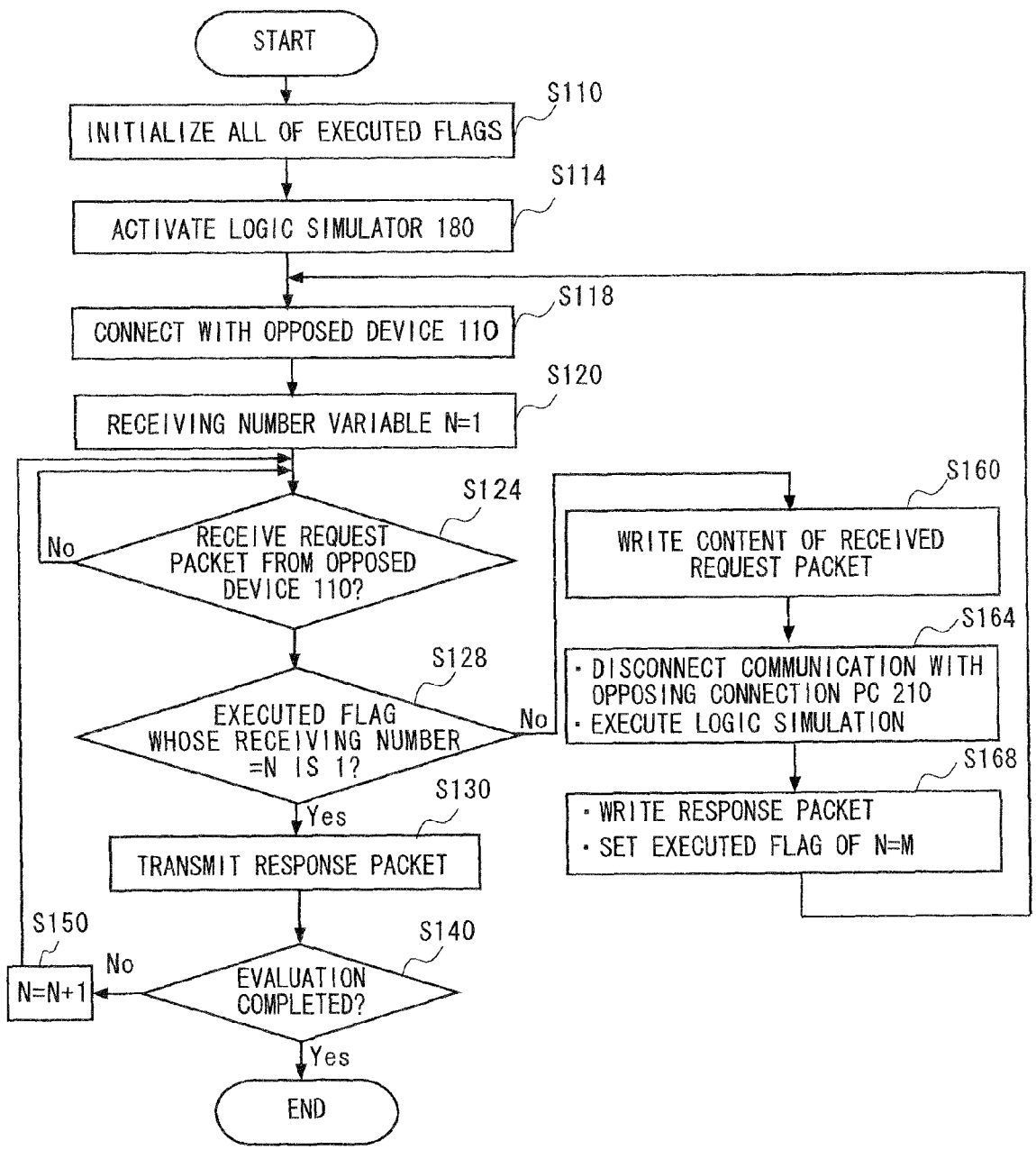
FIG. 3 is a flow chart showing a process flow of the system shown in FIG. 1.

FIG. 3 is a flow chart showing a process flow of the system 100 of the present embodiment. In starting the evaluation, the system controller 140 first initializes all the executed flags of the executed flag field 178 in the simulation result table 170 to "0" through the table generating part 190 (S110). Then the system controller 140 forces the network connecting part 134 to execute connection with the opposed device 110 after the logic simulator 180 is activated by the external operation entry W (S114, S118). The system controller 140 sets the receiving number variable N held inside thereof to "1" (S120) and waits for the request packet from the opposed device 110 (S124: No).

Upon receiving of the request packet from the opposed device 110 (S124: Yes), the target packet determination part 150 refers to the executed flag field 178 of the simulation result table 170, checks whether the flag corresponding to the receiving number identical to the value of the receiving number variable N is "1", and notifies the system controller 140 of the checking result (S128).

If the flag is "1" in the step S128 (S128: Yes), since the response packet that is to be transmitted or the target packet is stored in the simulation result table 170, the system controller 140 instructs the response packet output part 160 to transmit the response packet. The response packet output part 160 transmits the response packet to the opposed device 110 by reading out the response packet from the response packet field 176 in accordance with the instruction of the system controller 140 and outputting the response packet to the transceiver 132 (S130). Then the process of the system 100 moves to step S140.

In the step S140, the system controller 140 completes the process if the evaluation has been completed (S140: Yes). If the evaluation has not been completed (S140: No), then the system controller 140 increments the value of the receiving number variable N by one (S150) and waits for the next request packet from the opposed device 110 (S124~).

If the flag is "0" in the step S128 (S128: No), since the target packet is not stored in the simulation result table 170, the system controller 140 controls the table generating part 190 so as to write the request packet in a column corresponding to the receiving number identical to the value of the receiving number variable N in the request packet field 174 (S160). Further, the system controller 140 controls the network disconnecting part 136 so as to disconnect communication with the opposed device 110 and forces the logic simulator 180 to perform the logic simulation (S164).

The logic simulator 180 reads out the request packet corresponding to the receiving number identical to the value of the receiving number variable N from the request packet field 174 of the simulation result table 170 in accordance with the control of the system controller 140 to execute the logic simulation and obtain the response packet. Note that the request packet is written by the table generating part 190 in the step S160. The logic simulator 180 outputs to the table generating part 190 the response packet obtained by executing the logic system with respect to the request packet that is read out, and notifies the system controller 140 of completion of the logic simulation.

The table generating part 190 writes the response packet received from the logic simulator 180 in a column in the response packet field 176 corresponding to the receiving number identical to the value of the receiving number variable N, and sets the corresponding flag to "1" (S168). Upon receiving of notification of completion of the logic simulation from the logic simulator 180, the system controller 140 restarts the connection by forcing the network connecting part 134 to perform connection between the evaluation device and the opposed device (S118~).

As stated, the evaluation device 130 of the system 100 of the present embodiment forces the logic simulator 180 to execute the logic simulation for requiring the response packet with respect to the request packet and disconnects the communication between the opposed device 110 and the evaluation device 130 when the request packet is received but the response packet to be transmitted is not registered in the simulation result table 170. Upon completion of the logic simulation by the logic simulator 180 and obtaining of the response packet, the system controller 140 executes the connection between the opposed device 110 and the evaluation device 130 so as to restart the communication. Since the communication is disconnected while the logic simulator 180 executes the logic simulation, it is possible to prevent misjudgment that the protocol has an abnormality in the logic simulator 180 and to favorably advance the evaluation even when it takes time to obtain the response packet from the logic simulator 180.

Further, there may be a case in which the receiving side should transmit the response packet whose content is different depending on the internal state with respect to the same request packet. In a system configuration where the request packet and the response packet are held with being corresponded to each other and the response packet with respect to the request packet is transmitted based on the content of the request packet that is received, there is raised a problem that the situation where there are a plurality of response packets with respect to the same request packet cannot be addressed.

On the other hand, in many network protocols, the request packet is transmitted by the same sequence every time the communication is started (including restart after disconnection). In a system formed by the evaluation device and the opposing connection device connected via the network, we assume a case where the communication is disconnected after the opposing connection device transmits the request packet REQ 1, the request packet REQ 2, the request packet REQ 3, ... in this order in the first communication, for example. In the second communication started by reconnection, the opposing connection device transmits the request packet REQ 1, the request packet REQ 2, the request packet REQ 3, ... in a same sequence as in the first communication. In summary, the request packet transmitted in the predetermined order in one communication is also transmitted in the same order in other communications.

The system 100 of the present embodiment focuses on this point, and holds the request packet and the response packet with being corresponded to each other in a receiving number corresponding to the receive order. Then the response packet is determined based on the receiving number of the request packet in place of the content of the request packet that is received. Accordingly, the above problem can be solved.

Second Embodiment

Now, the embodiment to which the approach by the system 100 shown in FIG. 1 is applied will be described when there is a request packet defined not to make a response based on the network protocol. A USB 2.0 (hereinafter also referred to as USB) is used as an example of the network protocol.

Figure 4:
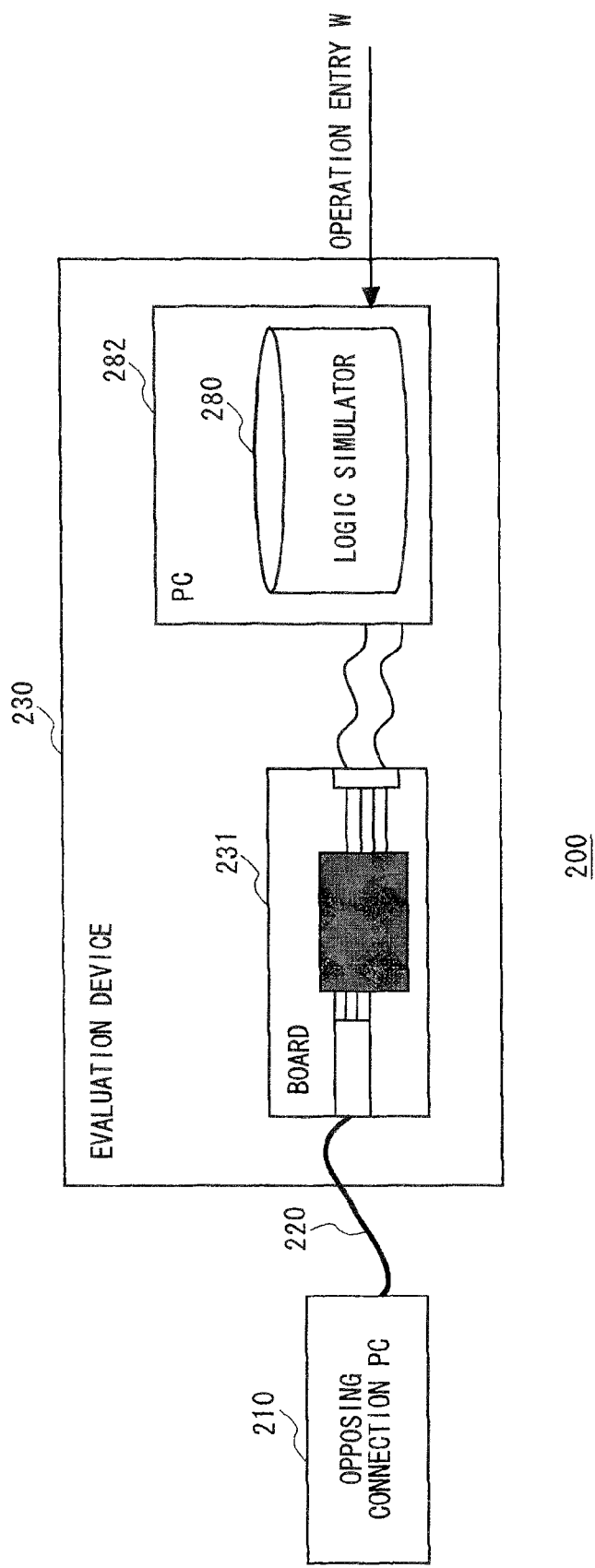
FIG. 4 is a block diagram showing a system according to a second embodiment of the present invention.

FIG. 4 is a system 200 according to the second embodiment of the present invention. The system 200 includes a personal computer (hereinafter referred to as opposing connection PC) 210 that is the opposed device, and an evaluation device 230. The opposing connection PC 210 and the evaluation device 230 are connected together by a USB network 220.

The opposing connection PC 210 includes a USB host controller which is not shown.

The evaluation device 230 includes a personal computer for evaluation (hereinafter simply referred to as PC) 282, and a board for evaluation 231 connected to the PC 282. The PC 282 includes a logic simulator 280 mounted thereon. The logic simulator 280 includes a logical description (not shown) of the logic circuit of the USB peripheral device which is the evaluation object, and operates on the PC 282.

Figure 5:
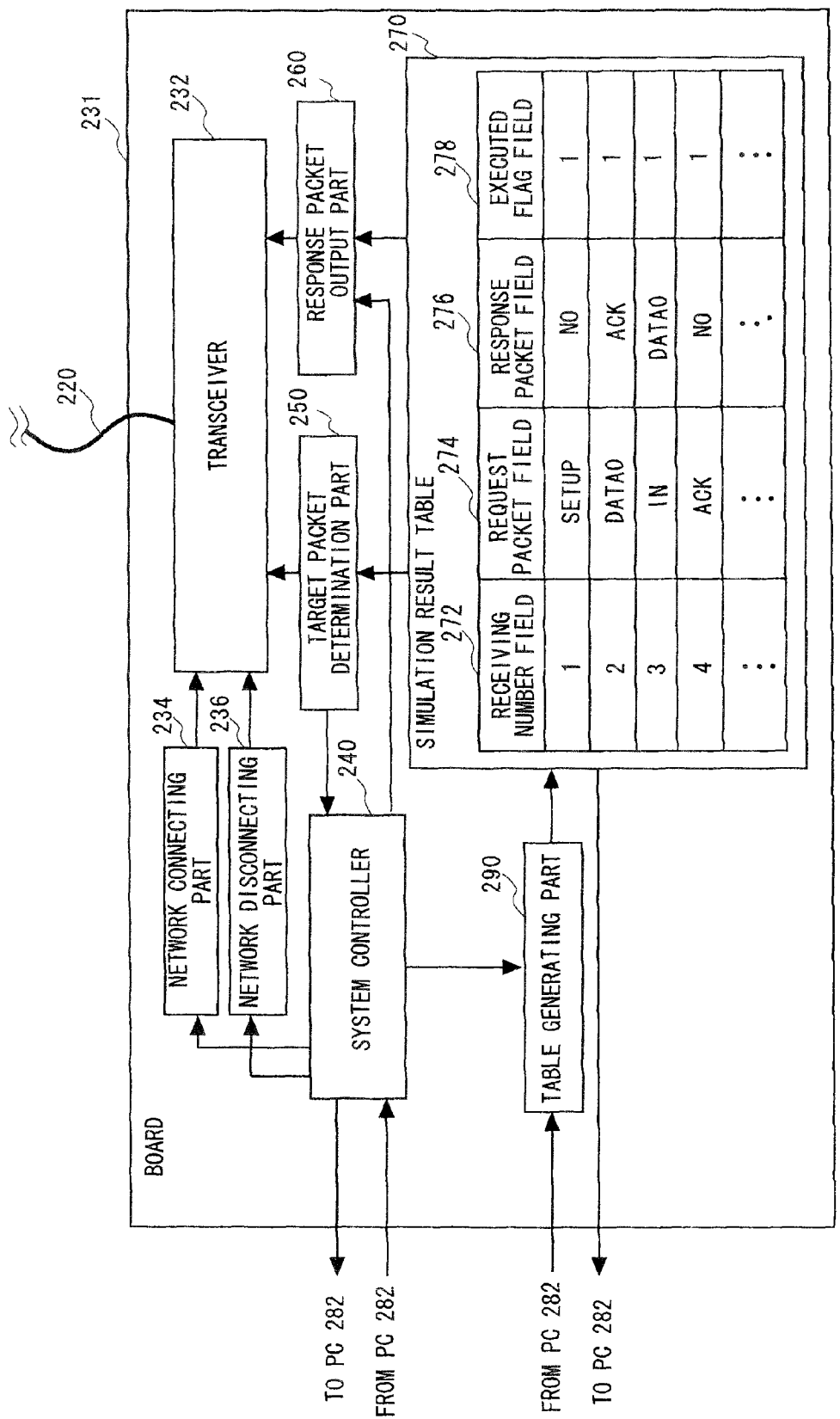
FIG. 5 is a block diagram showing a board in an evaluation device of the system shown in FIG. 4.

FIG. 5 shows the board 231 in the system 200 shown in FIG. 4. The board 231 includes a transceiver 232, a network connecting part 234, a network disconnecting part 236, a system controller 240, a target packet determination part 250, a response packet output part 260, and a simulation result table 270. The detailed configuration of each element block is substantially the same as the corresponding element block in the system 100 shown in FIG. 1, so the detailed description thereof is omitted here. Note that each of the network connecting part 234, the network disconnecting part 236, and the system controller 240 has a function as a controller in the claims.

The following packet is defined by a USB standard.

(1) Token packet (SOF/SETUP/IN/OUT/PING)

The token packet is transmitted by the USB host controller, and includes an address number, an endpoint number, and a CRC defined for the USB peripheral device.

(2) Data packet (DATA0/DATA1/DATA2/MDATA)

The data packet is transmitted or received by both the USB host controller and the USB peripheral device, and includes the data and the CRC that are transmitted or received.

(3) Handshake packet (ACK/NAK/NYET/STALL)

The handshake packet is transmitted or received by both the USB host controller and the USB peripheral device, and includes the CRC.

If we focus on the occurrence order of the packet between the USE host controller and the USB peripheral device, a type of transfer defined by the USB 2.0 standard can be classified into the following six types.

(1) OUT/SETUP transaction

1. The USB host controller sends the OUT packet or the SETUP packet.

2. The USB host controller sends the DATA0 or DATA1.

3. The USB peripheral device sends one of ACK, NAK, NYET, and STALL.

(2) IN transaction (when the USB peripheral device sends the data packet)

1. The USB controller sends the IN packet.

2. The USB peripheral device sends DATA0 or DATA1.

3. The USB host controller sends the ACK packet.

(3) IN transaction (when the USB peripheral device sends the handshake packet) and PING transaction 1. The USB host controller sends the IN packet or the PING packet.

2. The USB peripheral device sends one of ACK, NAK, and STALL.

(4) OUT transaction (in isochronous transfer)

1. The USB host controller sends the OUT packet.

2. The USB host controller sends one of the packets of DATA0, DATA1, DATA2, and MDATA.

(5) IN transaction (in isochronous transfer)

1. The USB host controller sends the IN packet.

2. The USB peripheral device sends DATA0 or DATA1.

(6) SOF transaction

1. The USB host controller sends the SOF packet.

In the OUT/SETUP transaction corresponding to the type (1) of the above six transfers, the USB peripheral device is set not to respond to the OUT packet or the SETUP packet transmitted from the USB host controller in the process (1) but to wait for the next request packet (DATA0 or DATA1 transmitted from the USB host controller in the process (2)) from the USB host controller.

In the same way, the USB peripheral device is set not to respond to the request packet transmitted from the USB host controller in the process 3 of type (2), to the packet transmitted from the USB host controller in the processes 1 and 2 of type (4), and to the request packet transmitted from the USB host controller in the process 1 of type (6).

Therefore, there are some cases in which the USB peripheral device is set not to respond to the request packet from the USB host controller according to the USB standard.

As shown in FIG. 5, in the present embodiment, the simulation result table 270 is formed by setting the response content of the response packet with respect to the request packet to "no". Accordingly, the evaluation of the USB peripheral device by the logic simulation can be made possible.

Figure 6:
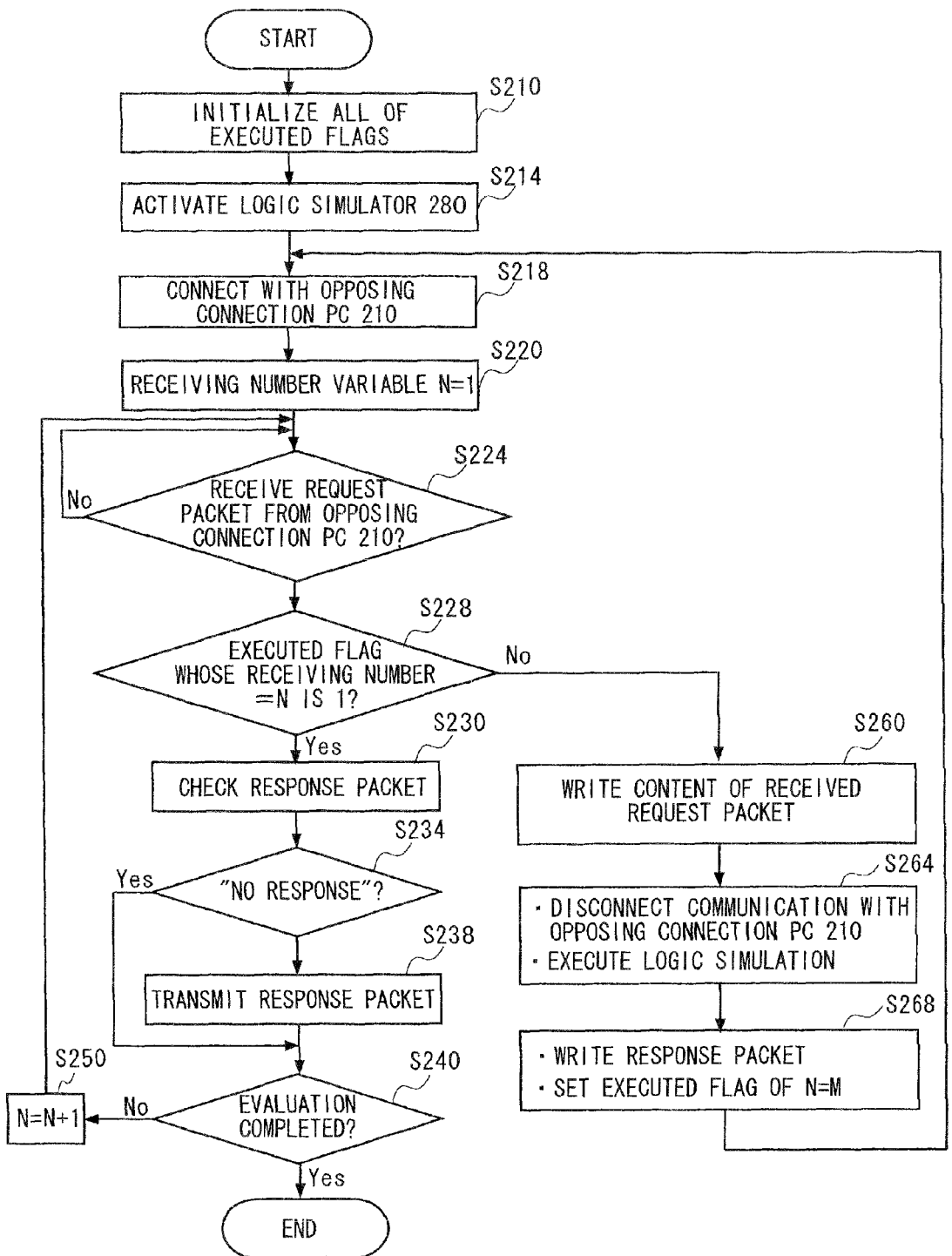
FIG. 6 is a flow chart showing a process flow of the system shown in FIG. 4.

FIG. 6 is a flow chart showing a process flow in the system 200 according to the present embodiment. In starting the evaluation, the system controller 240 first initializes all the executed flags of the executed flag field 278 in the simulation result table 270 to "1" through the table generating part 290 (S210). Then the system controller 240 forces the network connecting part 234 to connect the evaluation device with the opposing connection PC 210 after the logic simulator 280 implemented in the PC 282 is activated by the external operation entry W (S214, S218). Then the system controller 240 sets the receiving number variable N held inside to "1" (S220) and waits for the request packet from the opposing connection PC 210 (S224: No).

Upon receiving of the request packet from the opposing connection PC 210 (S224: Yes), the target packet determination part 250 refers to the receiver number field 272 and the executed flag field 278 of the simulation result table 270 to check whether the flag corresponding to the receiving number identical to the value of the receiving number variable N is "1" and notifies the system controller 240 of the checking result (S228).

When the flag is "1" in the step S228 (S228: Yes), since the response packet that is to be transmitted or the target packet is stored in the simulation result table 270, the system controller 240 instructs the response packet output part 260 to transmit the response packet. The response packet output part 260 refers to the response packet field 276 and checks the content of the corresponding response packet in accordance with the instruction of the system controller 240 (S230). Then if the content of the response packet is "no" (S234: Yes), then the response packet output part 260 does not transmit the response packet, and the process of the system 200 proceeds to the step S240. On the other hand, if the content of the response packet is other than "no" (S234: No), then the response packet output part 260 reads out the corresponding response packet from the simulation result table 270, outputs the response packet to the transceiver 232, and transmits the response packet to the opposing connection PC 210 (S238). Then the process of the system 200 proceeds to step S240.

In step S240, if the evaluation has been completed (S240: Yes), the system controller 240 completes the process. If the evaluation has not been completed (S240: No), the system controller 240 increments the value of the receiving number variable N by one (S250) and waits for the next request packet from the opposing connection PC 210 (S224~).

If the flag is "0" in the step S228 (S228: No), since the target packet is not stored in the simulation result table 270, the system controller 240 controls the table generating part 290 to write the request packet in a column in the request packet field 274 corresponding to the receiving number identical to the value of the receiving number variable N (S260). The system controller 240 further controls the network disconnecting part 236 to disconnect the communication with the opposing connection PC 210 and forces the logic simulator 280 to perform the logic simulation (S264).

The logic simulator 280 reads out the request packet corresponding to the receiving number identical to the value of the receiving number variable N from the request packet field 274 of the simulation result table 270, executes the logic simulation, and obtains the response packet in accordance with the control of the system controller 240. The request packet is written by the table generating part 290 in the step S260. The logic simulator 280 outputs the response packet obtained by executing the logic system with respect to the request packet that is read out to the table generating part 290 and notifies the system controller 240 of completion of the logic simulation.

The table generating part 290 writes the response packet received from the logic simulator 280 in a column in the response packet field 276 corresponding to the receiving number identical to the value of the receiving number variable N and sets the corresponding flag to "1" (S268). Upon receiving of the completion notification of the logic simulation from the logic simulator 280, the system controller 240 forces the network connecting part 234 to connect the evaluation device with the opposed device so as to restart the communication (S218~).

According to the system 200 of the present embodiment, it is possible to obtain the same effect as in the system 100 shown in FIG. 1. The present embodiment can also be applied to a case where there is a request packet defined not to be responded to.

Third Embodiment

Figure 7:
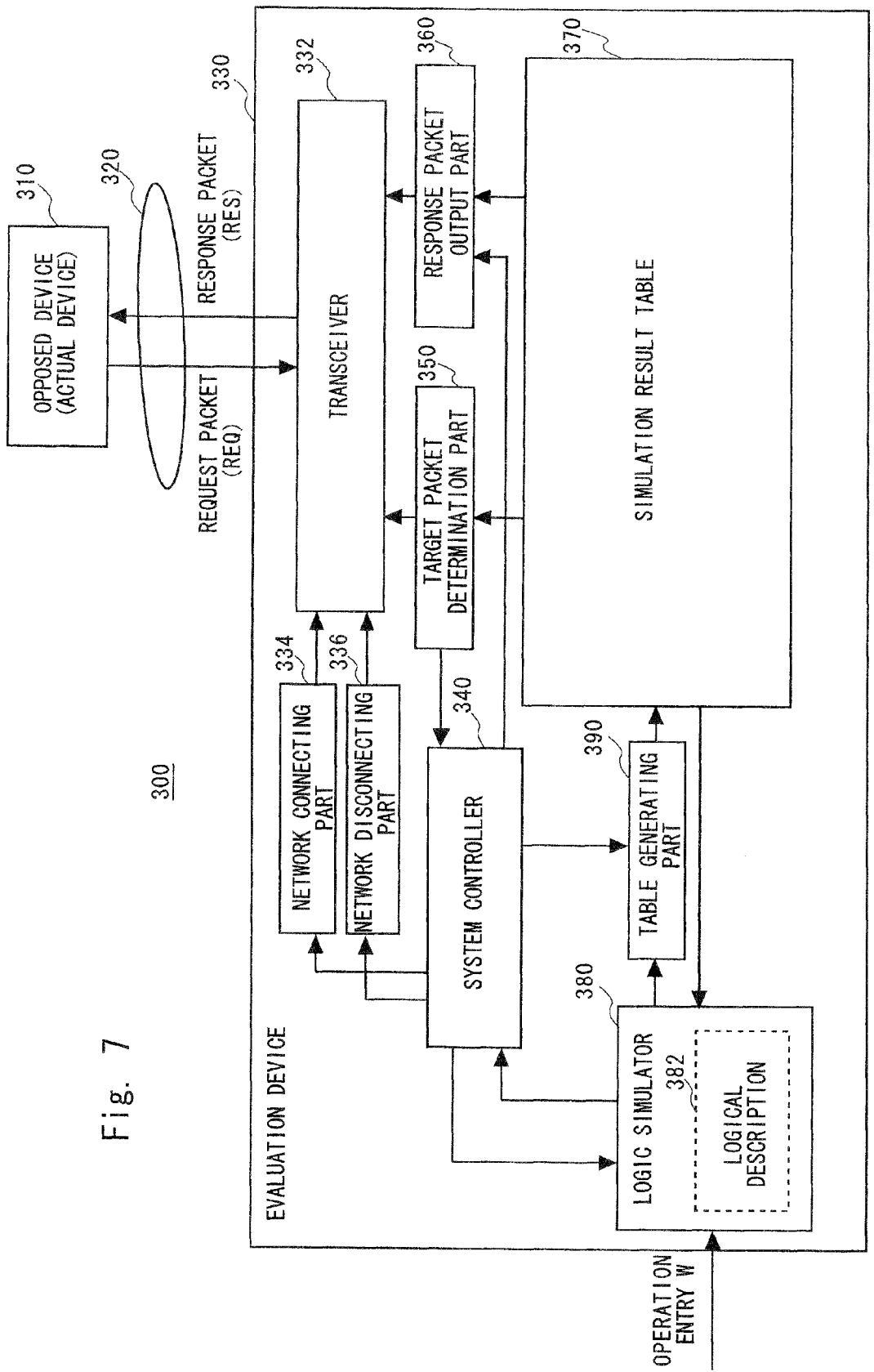
FIG. 7 is a block diagram showing a system according to a third embodiment of the present invention.

FIG. 7 shows a system 300 according to the third embodiment of the present invention. The systems 100 and 200 described above are directed to the network protocol in which the opposing connection device is defined to transmit the request packet in the same sequence as in the communication before disconnection when the connection is made and communication is restarted after the communication between the opposing connection device and the evaluation device is once disconnected. Therefore, in the communication device of the protocol in which the opposing connection device may transmit the request packet in a different order than that of the previous communication, the response packet which should not be transmitted may be output from the evaluation device to the opposing connection device and the correct evaluation may not be performed when the communication is restarted after the disconnection of the communication.

The system 300 can solve the problem.

In the system 300 shown in FIG. 7, configurations other than a simulation result table 370 are substantially the same as the element blocks in the system 100 of the first embodiment shown in FIG. 1. Therefore, the simulation result table 370 is hereinafter described in detail Note that "from start of connection to disconnection" is regarded as one communication.

The detail of the writing into each field of the simulation result table 370 will be described later, and first the configuration of the simulation result table 370 will now be described.

FIG. 8 shows a configuration of the simulation result table 370. The simulation result table 370 includes an identifier field 371, a parent identifier field 372, a request packet field 373, a response packet field 374, and an executed flag field 375.

The identifier field 371 stores an identifier that can uniquely identify the request packet. The same identifier is given to the request packet including the same content, and the different identifier is given to the request packet whose content is different.

The parent identifier field 372 stores the identifier of a request packet which is received one packet before the request packet in one communication. Additionally, when the identifier is given from "1", for example, the parent identifier "0" indicates that the request packet corresponding to the parent identifier (request packet which is in the same row as the parent identifier in FIG. 8) is the request packet which is received for the first time in this communication.

With reference to a tree shown in FIG. 9, a meaning of the identifiers and the parent identifiers of each row of the simulation result table 370 shown in FIG. 8 will be described.

Figure 9:
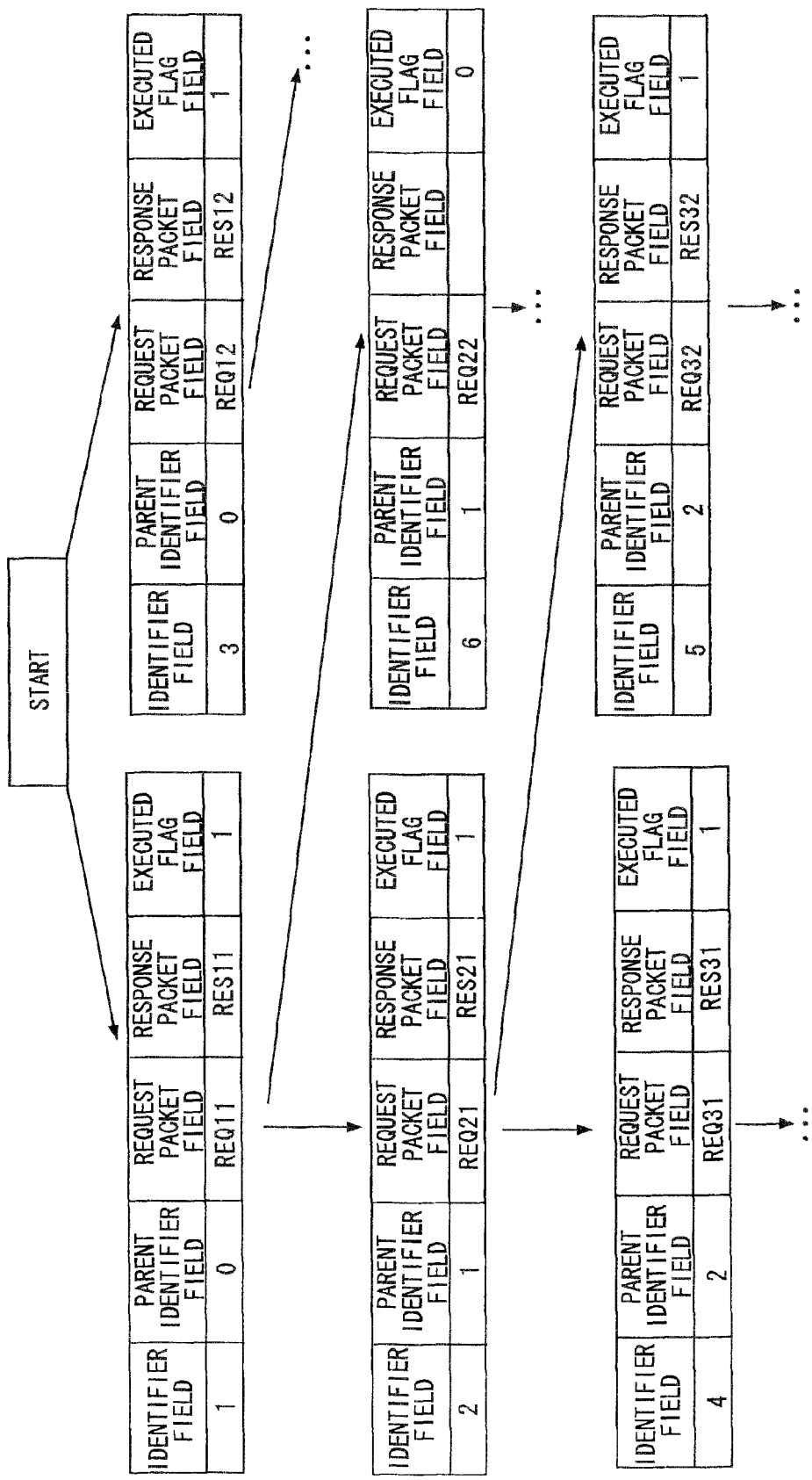
FIG. 9 is a diagram explaining operations of an identifier and a parent identifier in the simulation result table shown in FIG. 8.

A left upper side in FIG. 9 corresponds to a first row in FIG. 8. As shown, the identifier of the request packet REQ 11 is 1, and the parent identifier is 0 in the first row. Accordingly, the REQ 11 is received for the first time in this communication.

A middle left side in FIG. 9 corresponds to a second row in FIG. 8. As the parent identifier of the request packet REQ 21 whose identifier is 2 is 1, the request packet REQ 21 is received next to the request packet (REQ 11) whose identifier is 1.

A middle right side in FIG. 9 corresponds to a sixth row in FIG. 8. As the parent identifier of the request packet REQ 22 whose identifier is 6 is 1, the request packet REQ 22 is received next to the request packet (REQ 11) whose identifier is 1 in other communications.

A left lower side in FIG. 9 corresponds to a fourth row in FIG. 8. As the parent identifier of the request packet REQ 31 whose identifier is 4 is 2, the request packet REQ 31 is received next to the request packet (REQ 21) whose identifier is 2.

A right lower side in FIG. 9 corresponds to a fifth row in FIG. 8. As the parent identifier of the request packet REQ 32 whose identifier is 5 is 2, the REQ 32 is received next to the request packet (REQ 21) whose identifier is 2 in other communications.

Further, a right upper side in FIG. 9 corresponds to a third row in FIG. 8. As the parent identifier of the request packet REQ 12 whose identifier is 3 is 0, the REQ 12 is received for the first time of the communication other than the communication when the REQ 11 is received for the first time.

The process in the system 300 will now be described based on the configuration of the simulation result table 370.

Figure 10:
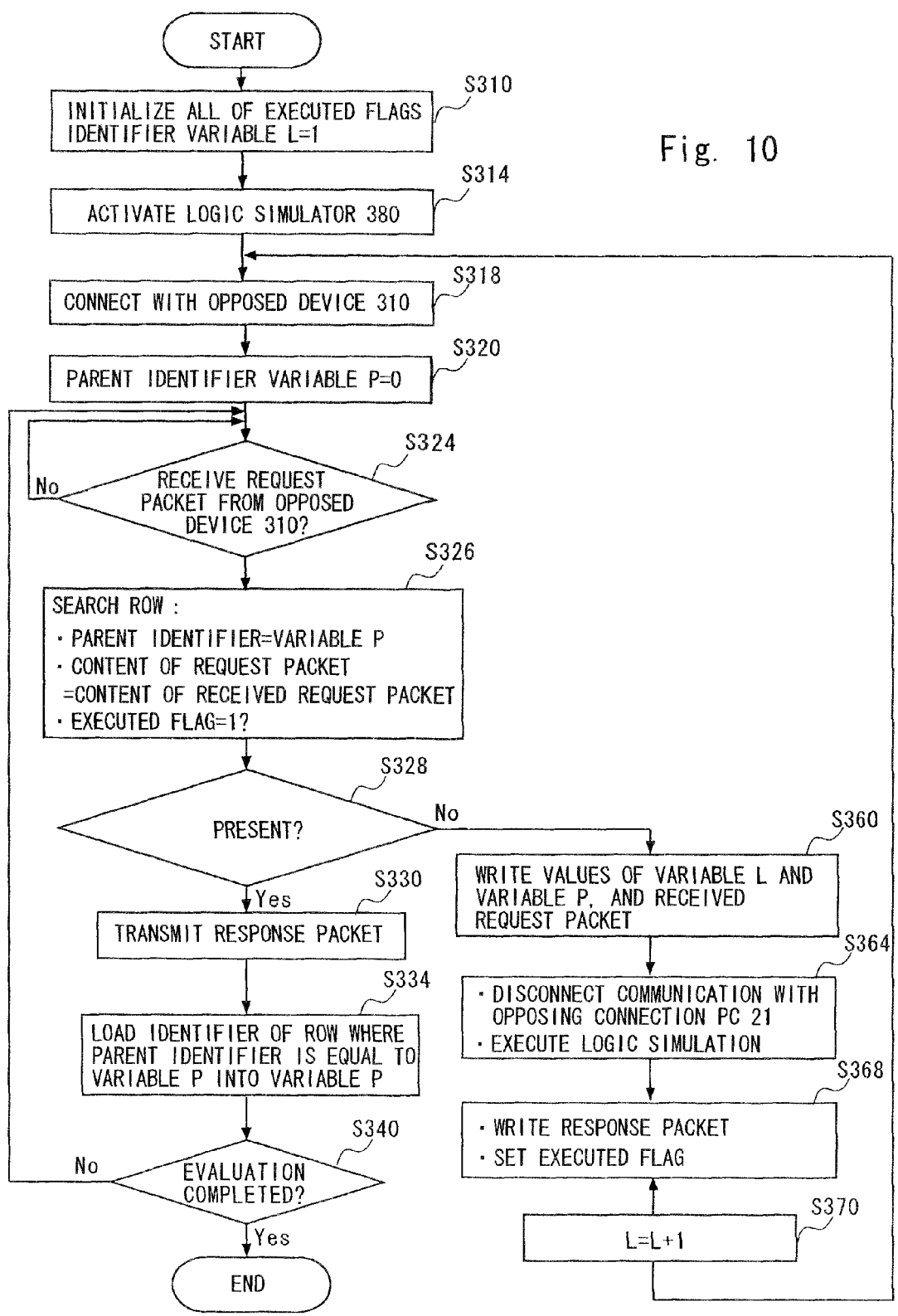
FIG. 10 is a flow chart showing a process flow of the system shown in FIG. 7.
Figure 13:
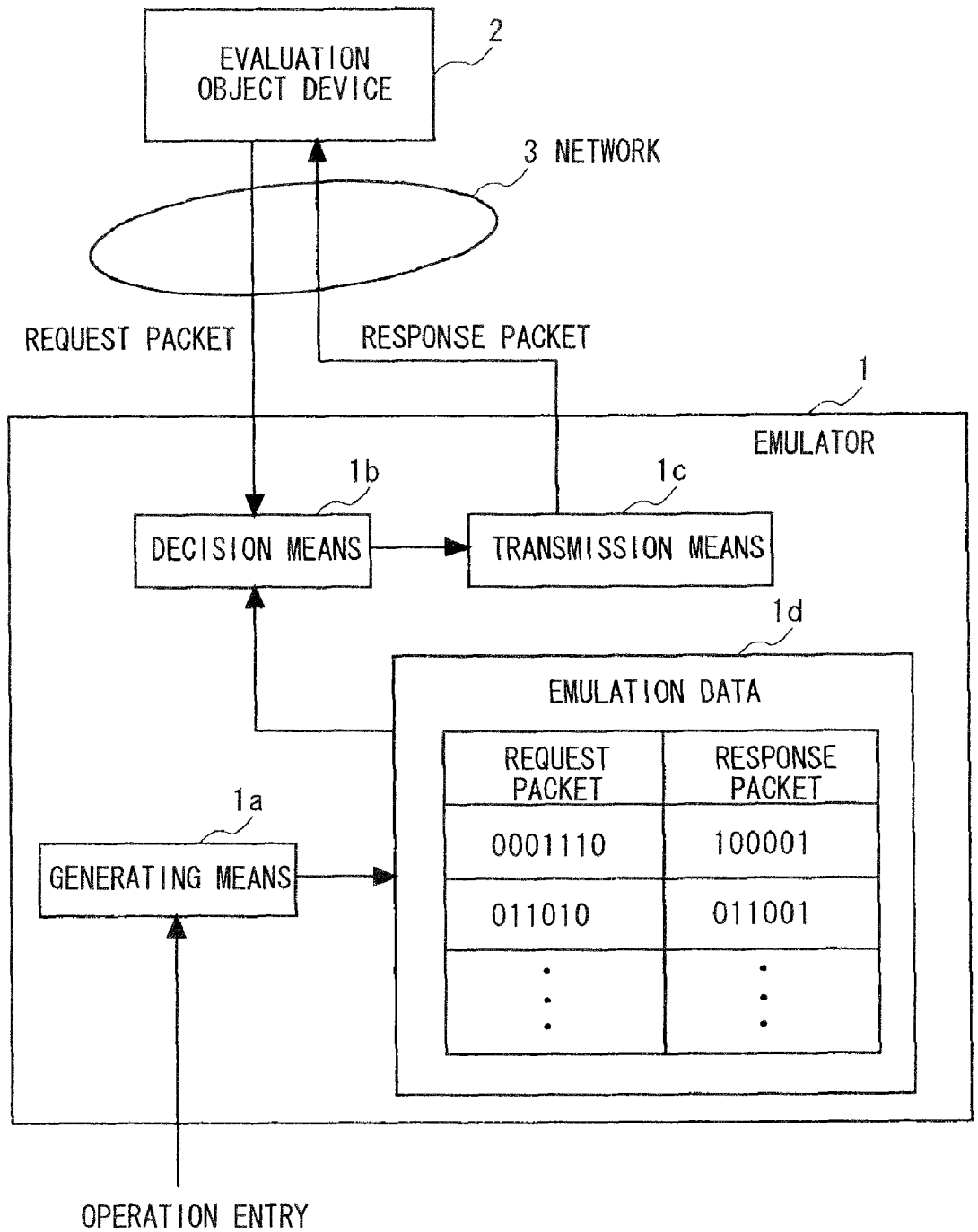
FIG. 13 is a diagram showing a related example of an evaluation system by emulation.
Figure 14:
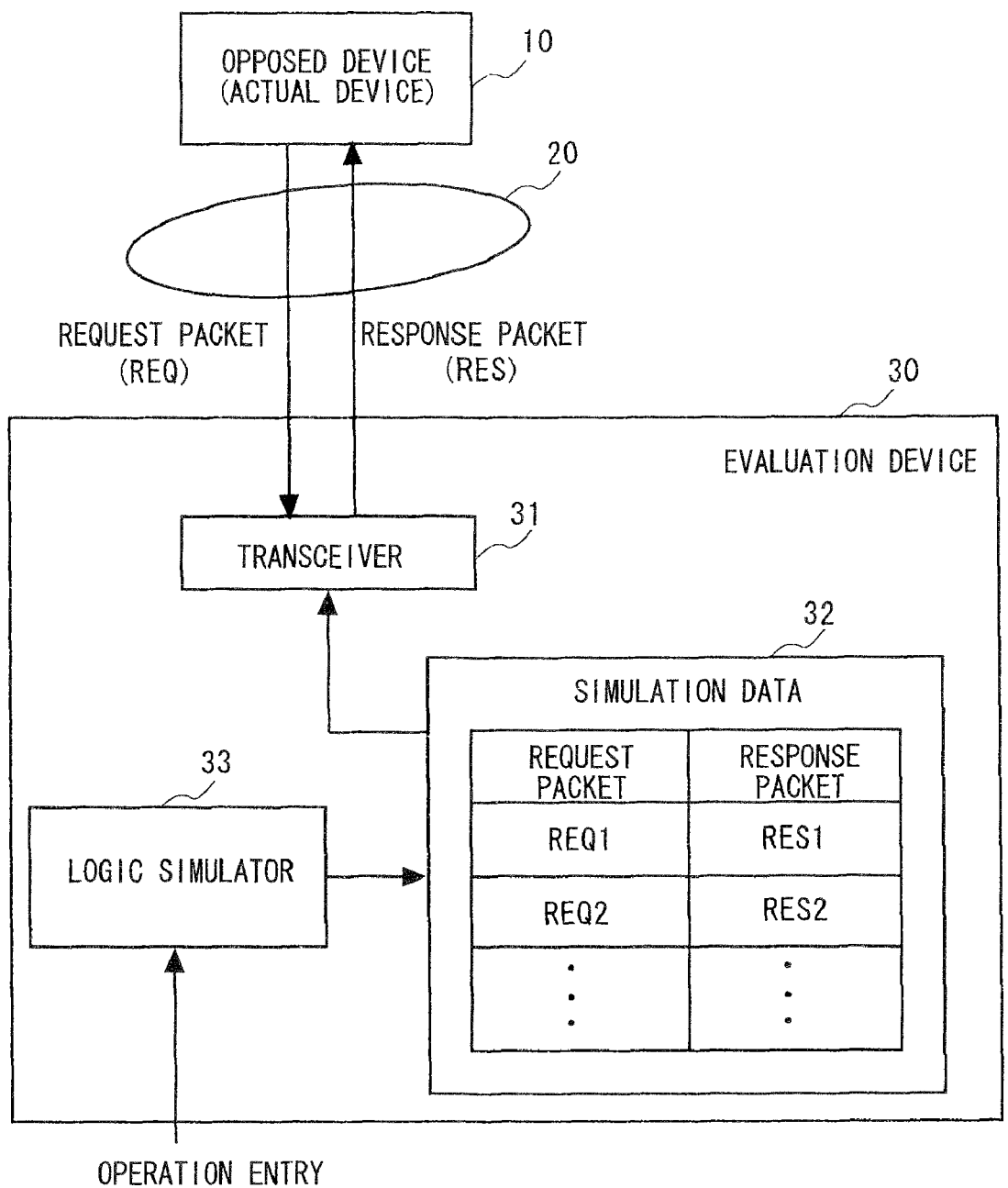
FIG. 14 is a diagram showing an example of a system which can be considered when the evaluation system shown in FIG. 13 is applied to the evaluation by logic simulation.
Figure 15:
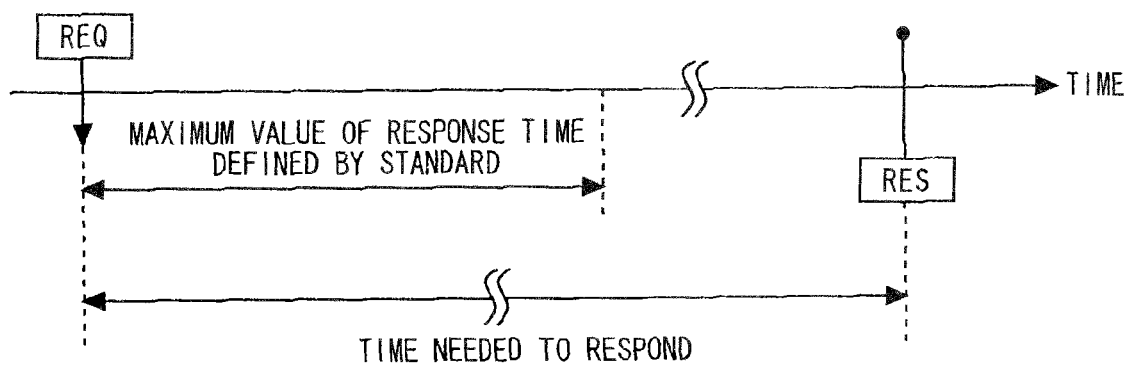
FIG. 15 is a diagram explaining a problem of the system shown in FIG. 14.

FIG. 10 is a flow chart showing a process flow in the system 300 shown in FIG. 7. In starting the evaluation, the system controller 340 first initializes all the flags of the executed flag field 375 in the simulation result table 370 to "0" through the table generating part 390 and initializes the identifier variable L held in the system controller 340 to "1" (S310). Then the system controller 340 starts communication by forcing the network connecting part 334 to connect the evaluation device 330 to the opposed device 310 after the logic simulator 380 is activated by the external operation entry W (S314, S318). Then the system controller 340 initializes the parent identifier variable P held inside to "0" (S320) and waits for the request packet from the opposed device 310 (S324: No).

Upon receiving of the request packet from the opposed device 310 (S324: Yes), then the target packet determination part 350 refers to the simulation result table 370 and searches for a row which satisfies three conditions of "the value of the parent identifier field 372 is the value of the variable P", "the content stored in the request packet field 373 corresponds to the content of the request packet received from the opposed device 310", and "the flag of the executed flag field 375 is "1"" (S326).

When the target row has been found as a result of searching in the step S326 (S328: Yes), since the response packet that is to be transmitted, which is the target packet, is stored in the simulation result table 370, the response packet output part 360 reads out the content of the response packet field 374 which is in the same row in accordance with the control of the system controller 340 and transmits the content to the opposed device 310 (S330). The system controller 340 further sets the value of the identifier field 371 in the row to the value of the new identifier variable and loads the set value into P. Then the system controller 340 finishes the processing when the evaluation has been completed (S340: Yes), or goes back to the step S324 when the evaluation has not been completed to wait for the receiving of the next request packet (S340: No, S324~).

On the other hand, when the target row has not been found as a result of searching in the step S326 (S328: No), then the table generating part 390 writes the value of the variable L, the value of the variable P, and the content of the received request packet in the same row of the field in the simulation result table 370 according to the control of the system controller 340 (S360). The system controller 340 further controls the network disconnecting part 336 to disconnect the communication with the opposed device 310 and forces the logic simulator 380 to execute the logic simulation of the received request packet (S364).

The logic simulator 380 reads out the response packet from the simulation result table 370 and executes the logic simulation to obtain the response packet according to the control of the system controller 340. Note that this request packet is written by the table generating part 390 in the step S360. The logic simulator 380 further outputs the response packet to the table generating part 390 and notifies the system controller 340 of the completion of the logic simulation.

The table generating part 390 writes the response packet received from the logic simulator 380 in the row where the identifier corresponds to the value of the identifier valuable L in the response packet field 374, which is the row in which writing is performed by the table generating part 390 in the step S360. The table generating part 390 further sets the flag in the same row to "1" (S368).

Then the system controller 340 increments the value of the identifier variable L by one and forces the network connecting part 334 to connect the evaluation device 330 with the opposed device 310, so as to start the next communication (S370, S318~). As shown in the step S319, the value of the parent identifier variable P is set back to the initial value of "0" before receiving the first request packet in the next communication. Therefore, when the first request packet is received at the next communication, the response packet which is received for the first time in the previous communication and corresponds to the request packet whose content is the same as that of the request packet is selected as the response packet that is to be transmitted (S326).

FIGS. 11 and 12 shows one example of transitions of the identifier variable L or the parent identifier variable P, and content written into the simulation result table 370 due to the transitions according to the processings described above. Note that the black borders surrounding the request packets in the left sides of FIGS. 11 and 12 indicate that the response packet with respect to the request packet is not registered in the simulation result table 370 and that the logic simulation needs to be performed.

As shown in FIG. 11, the identifier variable L and the parent identifier variable P are initialized to "1" and "0", respectively, when the communication is started. At this time, each field of the simulation result table 370 is in the initial state.

Since there is no row of "parent identifier=0 (value of P), request packet=REQ 11, executed flag=1" for the request packet REQ 11 which is received first, the communication is disconnected. In accordance with this, "1" (value of L), "0" (value of P), and "REQ 11" are written into the first row of the identifier field 371, the parent identifier field 372, and the request packet field 373 of the simulation result table 370, respectively.

The logic simulation for the REQ 11 is performed to obtain the response packet RES 11 of the REQ 11. In accordance with this, the RES 11 is written in the first row of the response packet field 374 and the flag in the first row of the executed flag field 375 is set to "1".

Then the identifier variable L is incremented by one to be "2" and the parent identifier variable P remains to be the initial value of "0" when the communication is restarted.

Since the row (row 1) of "parent identifier=0 (value of P), request packet=REQ 11, executed flag=1" can be found for the request packet REQ 11 which is received for the first time after restart of the communication, the response packet RES 11 which is stored in the first row of the response packet field 374 is transmitted. In accordance with this, the identifier of the first row of the identifier field 371 is loaded into the parent identifier variable P and the value of the parent identifier variable P is "1", whereas the identifier variable L remains "2".

Next, the request packet REQ 21 is received. Since there is no row of "parent identifier=1 (value of P), request packet=REQ 21, executed flag=1" for the REQ 21, the communication is disconnected. In accordance with this, "2" (value of L), "1" (value of P), and "REQ 21" are written into the second row of the identifier field 371, the parent identifier field 372, and the request packet field 373, respectively.

The logic simulation for the REQ 21 is executed to obtain the response packet RES 21 of the REQ 21. In accordance with this, the RES 21 is written into the second row of the response packet field 374, and the flag of the second row of the executed flag field 375 is set to "1".

Then when the communication is restarted, the identifier variable L is incremented by one to be "3", and the parent identifier variable P is set back to the initial value of "0".

The request packet which is received for the first time after restart of the communication is not REQ 11 but REQ 12 which has never been received before. Since there is no row of "parent identifier=0 (value of P), request packet=REQ 12, executed flag=1" for the REQ 12, the communication is disconnected. In accordance with this, "3" (value of L), "0" (value of P), and "REQ 12" are written into the third row of the identifier field 371, the parent identifier field 372, and the request packet field 373, respectively.

The logic simulation for the REQ 12 is executed to obtain the response packet RES 12 of the REQ 12. In accordance with this, the RES 12 is written into the third row of the response packet field 374 and the flag in the third row of the executed flag field 375 is set to "1".

Then the identifier variable L is incremented by one to be "4", and the parent identifier variable P remains to be the initial value of "0" upon restarting of the communication.

The communication is restarted, and receiving of the REQ 11, transmission of the RES 11, receiving of the REQ 21, and transmission of the RES 21 are performed. The parent identifier variable P is incremented by one along with the transmission of the RES 11 to be "1", and it is incremented again by one along with the transmission of the RES 21 to be "2". Since the connection has never been disconnected since restart of the communication, the identifier variable L remains to be "4".

The description will now be made with reference to FIG. 12. The lowermost step of FIG. 11 is shown in the uppermost step of FIG. 12 for the sake of clarity.

After transmission of the request packet RES 21 shown by the uppermost step of FIG. 12, the request packet REQ 31 is received. Since there is no row of "parent identifier=2 (value of P), request packet=REQ 31, executed flag=1" for the REQ 31, the communication is disconnected. Along with this, "4" (value of L), "2" (value of P), and "REQ 31" are written into the fourth row of the identifier field 371, the parent identifier field 372, and the request packet field 373, respectively.

The logic simulation for the REQ 31 is executed to obtain the response packet RES 31 of the REQ 31. In accordance with this, the RES 31 is written into the fourth row of the response packet field 374 and the flag of the fourth row of the executed flag field 375 is set to "1".

As stated, the new request packet and the response packet with respect to the new request packet are registered in the simulation result table 370 in accordance with the processings in the evaluation device 300, and the content is shown in FIG. 8.

These processings are repeated until completion of the evaluation.

The system 300 of the present embodiment disconnects the communication to perform the logic simulation and restarts the communication after obtaining the response packet when the response packet to be transmitted with respect to the received request packet is not registered in the simulation result table 370. Accordingly, it is possible to favorably proceed the evaluation by the logic simulation in the same way as in the systems 100 and 200 described above.

Further, in the evaluation device 330, the identifier of the request packet with respect to the transmitted response packet is loaded into the parent identifier variable P to update the value of the parent identifier variable P every time the response packet is transmitted. Then the response packet whose content is the same as that of the request packet and including the same parent identifier as the updated value of the parent identifier variable P is searched as the response packet that is to be transmitted, which is the target packet when the next request packet is received. Accordingly, even when the request packet is transmitted in a sequence different from that of the previous time from the opposed device upon restarting of the communication, it is possible to correctly determine the response packet to be transmitted and to accurately perform the evaluation.

It is apparent that the present invention is not limited to the above embodiments, but may be modified and changed without departing from the scope and spirit of the invention.

What is claimed is:

1. An evaluation device comprising:
a microprocessor programmed to perform as:
a logic simulator of a logic circuit capable of being connected with an opposing connection device via a network;
a simulation result table storing a request packet and a response packet while being made correspondent to each other, the response packet being obtained by performing logic simulation with respect to the request packet by the logic simulator;
a target packet determination part determining presence or absence of a target packet transmitted to the opposing connection device upon receiving of the request packet from the opposing connection device via the network, the target packet corresponding to the response packet made correspondent to the request packet in the simulation result table;
a response packet output part reading out the target packet from the simulation result table and transmitting the target packet to the opposing connection device upon determination of the presence of the target packet by the target packet determination part;
a controller forcing the logic simulator to perform the logic simulation for the request packet and disconnecting the connection with the opposing connection device upon determination of the absence of the target packet by the target packet determination part, and performing connection with the opposing connection device again after completion of the logic simulation by the logic simulator; and
a table generating part writing the response packet of the request packet obtained by the logic simulator into the simulation result table, the response packet being made correspondent to the request packet.

2. The evaluation device according to claim 1, wherein the simulation result table stores the response packet, the request packet, and a receiving number while being made correspondent to one another, the receiving number being in accordance with a receive order of the request packet since beginning of reception of a first request packet after connection with the opposing connection device, and
the target packet determination part determines presence or absence of the target packet corresponding to the response packet made correspondent to the receiving number of the request packet received in the simulation result table.

3. The evaluation device according to claim 2, wherein
the simulation result table further stores a flag indicating whether the simulation by the simulator is executed on the request packet, the flag being stored while being made correspondent to the receiving number of the request packet,
the target packet determination part determines presence or absence of the target packet by referring to the flag made correspondent to the receiving number of the request packet received in the simulation result table, and
the table generating part updates a flag corresponding to the response packet when the response packet obtained by the logic simulator is written into the simulation table.

4. The evaluation device according to claim 1, wherein
the simulation result table stores the request packet, the response packet, and a parent identifier while being made correspondent to one another, the parent identifier being information indicating a request packet received one packet before the request packet in one communication, the one communication being defined as from start of connection to disconnection, and
the target packet determination part determines presence or absence of the object packet which is the response packet made correspondent to a parent identifier identical to a parent identifier of the request packet received and made correspondent to the request packet identical to the request packet received in the simulation result table.

5. The evaluation device according to claim 4, wherein
the simulation result table further stores a flag indicating whether the simulation by the simulator is executed on the request packet, the flag being made correspondent to the request packet,
the target packet determination part determines the presence or absence of the target packet by referring to the flag made correspondent to the parent identifier identical to the parent identifier of the request packet received and made correspondent to the request packet identical to the request packet received in the simulation result table, and
the table generating part updates a flag corresponding to the response packet when the response packet obtained by the logic simulator is written into the simulation table.

6. The evaluation device according to claim 4, wherein
the simulation result table further stores an identifier capable of uniquely identifying the request packet, the identifier being made correspondent to the request packet, and
the parent identifier is the identifier of a request packet received one packet before the request packet in one communication.

7. The evaluation device according to claim 5, wherein
the simulation result table further stores an identifier capable of uniquely identifying the request packet, the identifier being made correspondent to the request packet, and
the parent identifier is the identifier of a request packet received one packet before the request packet in one communication.

8. The evaluation device according to claim 1, wherein the table generating part writes into the simulation result table information indicating that a result of simulation performed on the received request packet by the logic simulator indicates no response, the information being made correspondent to the request packet as the response packet, and
the response packet output part does not perform transmission when content of the response packet corresponding to the target packet indicates no response.

9. The evaluation device according to claim 2, wherein the table generating part writes into the simulation result table information indicating that a result of simulation performed on the received request packet by the logic simulator indicates no response, the information being made correspondent to the request packet as the response packet, and
the response packet output part does not perform transmission when content of the response packet corresponding to the target packet indicates no response.

10. The evaluation device according to claim 3, wherein the table generating part writes into the simulation result table information indicating that a result of simulation performed on the received request packet by the logic simulator indicates no response, the information being made correspondent to the request packet as the response packet, and
the response packet output part does not perform transmission when content of the response packet corresponding to the target packet indicates no response.

11. The evaluation device according to claim 4, wherein the table generating part writes into the simulation result table information indicating that a result of simulation performed on the received request packet by the logic simulator indicates no response, the information being made correspondent to the request packet as the response packet, and
the response packet output part does not perform transmission when content of the response packet corresponding to the target packet indicates no response.

12. The evaluation device according to claim 5, wherein the table generating part writes into the simulation result table information indicating that a result of simulation performed on the received request packet by the logic simulator indicates no response, the information being made correspondent to the request packet as the response packet, and
the response packet output part does not perform transmission when content of the response packet corresponding to the target packet indicates no response.

13. The evaluation device according to claim 6, wherein the table generating part writes into the simulation result table information indicating that a result of simulation performed on the received request packet by the logic simulator indicates no response, the information being made correspondent to the request packet as the response packet, and
the response packet output part does not perform transmission when content of the response packet corresponding to the target packet indicates no response.

14. The evaluation device according to claim 7, wherein the table generating part writes into the simulation result table information indicating that a result of simulation performed on the received request packet by the logic simulator indicates no response, the information being made correspondent to the request packet as the response packet, and
the response packet output part does not perform transmission when content of the response packet corresponding to the target packet indicates no response.

* * * * *